W. KRAMER.
SPOOL FOR FISHING REELS.
APPLICATION FILED MAR. 24, 1910. RENEWED SEPT. 18, 1912.
1,056,428.
Patented Mar. 18, 1913.
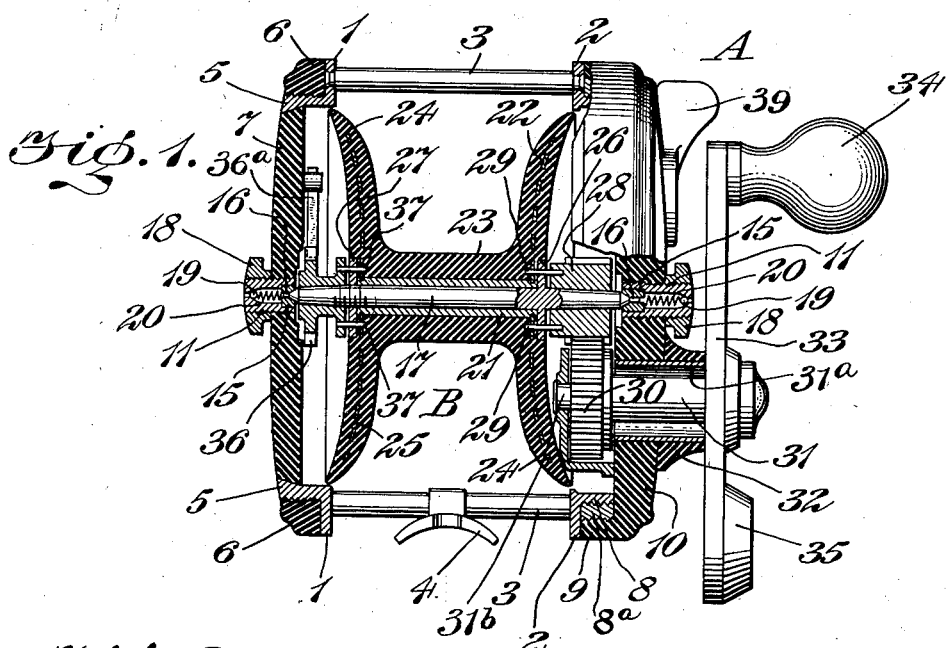
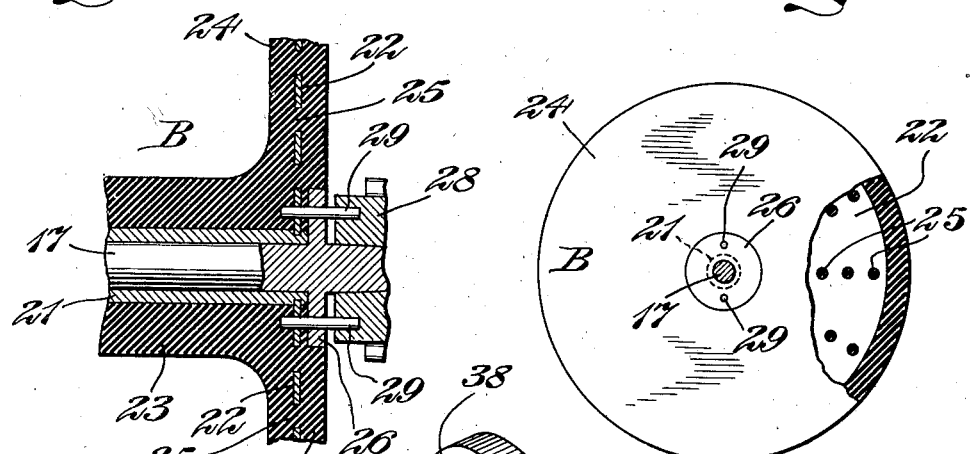
WITNESSES
INVENTOR
William Kramer
ATTORNEY

UNITED STATES PATENT OFFICE.

WILLIAM KRAMER, OF BROOKLYN HILL, NEW YORK.

SPOOL FOR FISHING-REELS.

1,056,428.   Specification of Letters Patent.   Patented Mar. 18, 1913.

Application filed March 24, 1910, Serial No. 551,373. Renewed September 18, 1912. Serial No. 721,099.

*To all whom it may concern:*

Be it known that I, WILLIAM KRAMER, a citizen of the United States, and a resident of Brooklyn Hill, in the county of Queens and State of New York, have invented certain Improvements in Spools for Fishing-Reels, of which the following is a specification.

This invention relates to certain improvements in spools such as are employed in fishing reels, and the principal object of the invention is to produce a spool of this type formed from plastic material and suitably reinforced at certain points where experience has shown that breakage is most liable to occur. A further object being the production of a spool, constructed in the manner above described, that will be capable of convenient and effective assemblage with the other parts of the reel.

The invention consists in certain novel features of the construction, and combination and arrangement of the several parts of the improved spool, whereby certain important advantages are attained, and the device is rendered simpler, less expensive, and otherwise better adapted and more convenient for use, all as will be hereinafter fully set forth.

The novel features of the invention will be carefully defined in the claims.

In the accompanying drawings which serve to illustrate my invention—Figure 1 is a fragmentary vertical section through a reel embodying my improvements; Fig. 2 is an end elevation of the reel spool, partly broken away to illustrate the means for reinforcing the same; Fig. 3 is an enlarged fragmentary detail section taken axially through the spool and click wheel, and Fig. 4 is a detail perspective view showing a modified form of the spool shaft, with the collar for securing the spool against lateral movement on said shaft.

Referring more particularly to the drawings, A represents a reel having a metallic cage-like frame consisting of two annular bands or rings 1 and 2, spaced apart and connected by means of tie-bars 3, 3 arranged at suitable intervals, the ends of said tie-bars being reduced and passed through the bands or rings 1 and 2, and being riveted upon the outer faces thereof to afford a rigid connection between the parts. The concaved metal plate 4 is held upon the tie-bars 3 at one side of the reel, allowing the same to be secured in a usual manner to the reel-seat of the fishing rod.

The annular band or ring 1 at one end of the cage-like frame of the device is provided with an outwardly directed annular flange 5 which is exteriorly screw-threaded to receive upon its perimetral surface a ring 6 of hard rubber, while the inner surface of flange 5, adjacent to its outer edge, is in a conical form and is adapted to receive an end plate 7 also formed of hard rubber which is tightly fitted within said conical portion of the ring 1 in such a manner as to securely close that end of the reel. The annular band or ring 2 at the opposite end of the cage-like frame of the device is also provided with an outwardly directed annular flange 8 which is exteriorly screw-threaded to receive an annular member 8ª of metal, which is also provided with exterior screw threads fitting snugly within a correspondingly formed screw threaded internal surface produced within an annular edge flange 9 upon a hard rubber end plate 10 which is thus adapted to tightly close the end of the reel opposite to the end plate 7.

The opposite end plates 7 and 10 of the improved reel are provided with centrally located and alined bearing pieces 11, 11, which are externally screw-threaded for engagement with correspondingly screw-threaded apertures at the central parts of the respective end plates so that said bearing pieces may be adjusted toward and from each other in assembling the parts of the reel for securing accurate adjustment of the bearings 15, 15 wherein the journals 16, 16, at opposite ends of the spool shaft 17 are engaged to turn. Said bearings 15, 15 are preferably in the form of hardened steel cups, and as herein shown, the journals 16, 16, at the ends of the spool shaft 17 are coned to permit accurate adjustment of the parts at assemblage and to take up wear. Lock-nuts 18 are herein shown screwed upon the outer ends of the bearing pieces 11, 11, to hold them in secure adjusted position and also to prevent leakage of water between the parts, and the bearing pieces are provided with bores which afford communication from the exterior to the cups 15, 15, so that the same may be lubricated from time to time if desired. These bores are closed normally at their outer ends by means of ball valves 19, preferably of glass so that they may not be corroded by contact with water, and which are normally pressed into seated position by means of springs 20 in such a way as to prevent the entry of water or grit into the bearings.

I have discovered that while spools formed from hard rubber or the like are very desirable for use in reels, such spools are also liable to be readily broken, and for this reason I have shown herein an arrangement of spool wherein the hard rubber or other similar molded body portion thereof is provided with a metallic reinforce embedded within it.

B represents a spool which is shown in detail in Figs. 1, 2 and 3, and comprises a metal sleeve 21 through which the spool shaft 17 is passed, and metal end reinforces 22, 22 of circular formation, secured upon the ends of said sleeve 21, and embedded in the hard rubber or other composition 23 from which the body portion of the spool is formed in such a way that the metallic reinforces 22, 22 are completely covered by the hard rubber or other composition, thereby forming the flanges 24 of the spool B. The metallic end pieces or reinforces 22, 22 are preferably provided with closely adjacent apertures 25, 25 through which the hard rubber or other composition 23 is adapted to be passed in the molding of the spool in such a way as to bind together those portions of the hard rubber covering which are extended over the reinforces at the flanges of the spool to prevent the covering composition from being broken or scaled away.

An annular flange or circular metallic part 26 is formed upon, or integrally secured to the spool shaft 17 near one of its ends, its other end being externally threaded to receive an internally threaded collar or circular metallic part 27. The sleeve 21 is adapted to be secured between the annular flange 26 and the collar 27 which are preferably countersunk in the end of the spool as shown in Fig. 1.

The spool shaft 17 carries at its end adjacent to the end plate 10, and at the inner side of said end plate, a gear pinion 28 which is held in engagement with the spool B by means of pins 29 passing through apertures in the annular flange 26 and the metallic reinforce 22 adjacent thereto, the said openings in the metallic reinforce 22 through which the pins 29 pass exposing the metallic reinforcements 22, 22 which were elsewhere embedded within the spool. The gear pinion 28 is adapted to be engaged by a spur gear wheel 30 which is capable of turning movement upon the inner end of an actuating shaft 31 mounted on the stud 31$^b$, which is extended through a sleeve 31$^a$ held within a boss 32 formed upon the end plate 10, and to the outer end of which is secured an actuating lever or crank 33 one end whereof is provided in a well known way with a crank handle 34 while the opposite end thereof is provided with the usual form of counterbalance 35. A thumb piece 39 is adapted to be manipulated whereby its intimate structure controls the relative positions of the pinion 28 and the gear wheel 30 which is more particularly set forth in my co-pending application Serial No. 397,237, filed October 14, 1907.

A click wheel 36, adapted to be actuated in any suitable manner, and engaged by the click pawl 36$^a$ is secured upon the end of the spool shaft opposite to the pinion 28 and said click wheel is held in engagement with the spool B by means of pins 37 which pass through apertures 38 in the collar 27 and the metallic reinforce 22 adjacent to said collar, the pins 37 also serving to lock the collar 27 against turning movement upon the shaft 17 upon which it is threaded.

While the portion of the spool shaft that engages the sleeve 21 is preferably of a cylindrical formation, it may be desirable to form said sleeve with a slightly tapered or conical bore, the corresponding portion of the spool shaft being similarly formed as shown in Fig. 4, tapering from the annular flange 26 toward the collar 27, whereby the spool B may be tightly fitted to the spool shaft by tightening the threaded collar or nut 27.

From the above description it will be seen that the improved spool constructed according to my invention is of an extremely simple and comparatively inexpensive nature, and is particularly well adapted for use by reason of its strength, lightness, and convenience of assemblage, and it will also be obvious from the above description that the device is susceptible of considerable change without material departure from the principles and spirit of the invention, and for this reason I do not desire to be understood as limiting myself to the precise form and arrangement of the several parts herein set forth in carrying out my invention in practice.

Having thus described my invention, what I claim as new and desire to secure by Letters Patent is:—

1. A fishing reel having a flanged spool formed from plastic material and provided with reinforcements exposed at opposite ends of the rotative axis of the spool for engagement with securing means, said reinforcements including circular metallic parts embedded in opposite ends of said spool and extended within the flanges thereof to prevent breakage and a tubular metal sleeve extended axially through the spool with opposite ends secured to said circular parts and provided with a bore for the passage of a spool shaft and adapted to prevent splitting of the spool when pressure is brought to bear upon opposite ends of said spool.

2. A fishing reel having a shaft, a spool provided with reinforces embedded in its opposite ends mounted upon such shaft, devices carried by the shaft adapted to prevent movement of the spool relatively to the shaft, one of said devices being removable to permit withdrawal of the spool from the shaft, and means passing through the devices engaging the reinforces embedded within the spool to prevent movement of the spool on the shaft.

3. A fishing reel having a shaft, a spool provided with reinforces embedded in its opposite ends mounted upon said shaft, devices carried by the shaft adapted to prevent movement of the spool relatively to the shaft, one of said devices being removable to permit withdrawal of the spool from the shaft, and pins passing through the devices engaging the reinforces embedded within the spool to prevent movement of the spool on the shaft.

4. A fishing reel having a shaft, an annular flange formed thereon and a collar having threaded engagement with said shaft, a spool provided with reinforces at its opposite ends mounted on said shaft and held against lateral movement thereon by the annular flange and collar, a gear pinion mounted on said shaft, a click wheel mounted on said shaft, and pins passing through the flange and the collar engaged with the reinforces of the spool and with the gear pinion and click wheel to prevent turning movement of said spool, gear pinion and click wheel on said shaft.

5. A fishing reel having a shaft, an annular flange formed thereon and a collar having threaded engagement with said shaft, a spool provided with reinforces at its opposite ends mounted on said shaft and held against lateral movement thereon by the annular flange and collar and means extended in a direction parallel to the axis of the shaft whereby said annular flange and said collar may be engaged with the reinforces of the spool.

6. A fishing reel having a shaft, an annular flange formed thereon, and a collar having threaded engagement with said shaft, a spool provided with reinforces at its opposite ends mounted on said shaft and held against lateral movement thereon by the annular flange and collar, a gear pinion mounted on said shaft, a click wheel mounted on said shaft, and means extended in a direction parallel to the axis of the shaft whereby the annular flange and the collar may be engaged with the reinforces of the spool and with the gear pinion and click wheel to prevent turning movement of said spool, gear pinion, and click wheel on said shaft.

7. A fishing reel having a shaft, a spool provided with a reinforcement mounted upon said shaft exposed at opposite ends of the rotative axis of the spool but elsewhere embedded therein and devices carried by the shaft engageable with the exposed parts of said reinforcement to prevent movement of the spool relatively to the shaft.

In witness whereof I have hereunto signed my name this 25 day of February 1910, in the presence of two subscribing witnesses.

WILLIAM KRAMER.

Witnesses:
   WILFRED E. LAWSON,
   G. MOURET.